US 8,554,700 B2

(12) United States Patent
Kanungo et al.

(10) Patent No.: US 8,554,700 B2
(45) Date of Patent: Oct. 8, 2013

(54) ANSWER MODEL COMPARISON

(75) Inventors: Tapas Kanungo, Redmond, WA (US); Kuansan Wang, Bellevue, WA (US); Ran Gilad-Bachrach, Bellevue, WA (US); Kieran McDonald, Seattle, WA (US); Kumaresh Pattabiraman, Redmond, WA (US); Christopher Meyers, Kirkland, WA (US); Ashok Ponnuswami, Redmond, WA (US); Luke Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 12/959,402

(22) Filed: Dec. 3, 2010

(65) Prior Publication Data

US 2012/0143794 A1 Jun. 7, 2012

(51) Int. Cl.
*G06F 15/18* (2006.01)

(52) U.S. Cl.
USPC ............................................. 706/12; 707/707

(58) Field of Classification Search
None
See application file for complete search history.

(56) References Cited

U.S. PATENT DOCUMENTS

| | | | |
|---|---|---|---|
| 6,516,312 B1* | 2/2003 | Kraft et al. | 707/610 |
| 7,383,247 B2* | 6/2008 | Li et al. | 1/1 |
| 7,464,075 B2 | 12/2008 | McSherry et al. | |
| 2005/0234904 A1* | 10/2005 | Brill et al. | 707/5 |
| 2006/0004811 A1 | 1/2006 | McSherry | |
| 2007/0094285 A1 | 4/2007 | Agichtein et al. | |
| 2007/0174320 A1* | 7/2007 | Chou | 707/101 |
| 2007/0233679 A1* | 10/2007 | Liu et al. | 707/7 |
| 2007/0276773 A1* | 11/2007 | Aravamudan et al. | 706/11 |
| 2009/0006360 A1 | 1/2009 | Liao et al. | |
| 2009/0132515 A1* | 5/2009 | Lu et al. | 707/5 |
| 2009/0182723 A1 | 7/2009 | Shnitko et al. | |
| 2010/0057717 A1* | 3/2010 | Kulkami | 707/5 |
| 2010/0114878 A1* | 5/2010 | Lu et al. | 707/723 |
| 2011/0040749 A1* | 2/2011 | Ceri et al. | 707/723 |
| 2011/0208735 A1* | 8/2011 | Gao et al. | 707/730 |
| 2012/0059658 A1* | 3/2012 | Sejnoha et al. | 704/270 |
| 2012/0059813 A1* | 3/2012 | Sejnoha et al. | 707/707 |

OTHER PUBLICATIONS

Agichtein E. et al.,"Improving Web Search Ranking by Incorporating User Behavior Information", SIGIR'06, Aug. 6-11, 2006, Seattle, Washington, USA, pp. 19-26.*
Cambazoglu et al., "Early Exit Optimizations for Additive Machine Learned Ranking Systems", Retrieved at << http://www.wsdm-conference.org/2010/proceedings/docs/p411.pdf >>, Feb. 4-6, 2010, pp. 10.
Ramadhan et al., "A Heuristic Based Approach for Increasing the Page Ranking Relevancy in Hyperlink Oriented Search Engines: Experimental Evaluation", Retrieved at << http://www.gbspublisher.com/ijtacs/1004.pdf >>, International Journal of Theoretical and Applied Computer Sciences, vol. 1 No. 1 (2006) pp. 49-62.
Agarwal et al., "Learning to Rank", Retrieved at << http://web.mit.edu/shivani/www/Ranking-NIPS-05/Proceedings/proceedings-nips05workshop-ranking.pdf >>, Proceedings of the NIPS 2005 Workshop, Dec. 9, 2005, pp. 44.

* cited by examiner

*Primary Examiner* — Jeffrey A Gaffin
*Assistant Examiner* — Dave Misir

(57) ABSTRACT

This patent application pertains to answer model comparison. One implementation can determine a first frequency at which an individual answer category appears in an individual slot on a query results page when utilizing a first model. The method can ascertain a second frequency at which the individual answer category appears in the individual slot on the query results page when utilizing a second model. The method can calibrate the second model so that the second frequency approaches the first frequency.

20 Claims, 5 Drawing Sheets

ANSWER MODEL COMPARISON

BACKGROUND

The present discussion relates to user search queries and presenting material responsive to user search queries. When a user enters a search query a search engine generates search results for the search query. The search results are ranked according to estimated relevancy. A user interface is generated for the user that displays a number of high ranking search results. The user interface may also present additional content (hereinafter, "answers") with the high ranking search results. The answers can be organized into various answer categories, such as video, image, news, local, commerce, finance, and/or shopping, among others. Various answer models exist for selecting the answers and for selecting how the answers are presented to the user relative to the high ranking search results.

SUMMARY

This patent application pertains to answer model comparison. One implementation can determine a first frequency at which an individual answer category appears in an individual slot on a query results page when utilizing a first answer model. The method can ascertain a second frequency at which the individual answer category appears in the individual slot on the query results page when utilizing a second answer model. The method can calibrate the second answer model so that the second frequency approaches the first frequency.

Another implementation can include an answer model calibration module. The answer model calibration module can be configured to maintain one or more characteristics of a search results page produced utilizing a first answer model by calibrating thresholds applied by a second answer model to the one or more characteristics.

The above listed implementations are provided for introductory purposes and do not include all of, and/or limit, the claimed subject matter.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent pertains to search queries. More specifically, the discussion relates to ranking and organizing materials responsive to search queries. When a user enters a search query, a search engine can be utilized to obtain ranked search results. A search results page can be configured that lists a number of high ranking search results and which may include one or more positions or slots. A slot can be populated with an answer category that augments the search results. Examples of answer categories can include images, video, news, and local answer categories, among others. The answer model can determine characteristics of the search results page, such as when to present an answer category and in which slot.

Situations can arise where a new answer model is developed. For instance, the new answer model may be judged to provide a search results page that is more relevant than the existing model. For instance, the answers populated in an individual answer category may be deemed more relevant than those populated by the existing model. However, it may be desired to maintain some characteristics of the search results page produced by the existing model. For instance, it may be desired to approximate a frequency that the existing model populates an individual answer category in an individual slot with the new model.

For purposes of explanation consider introductory method 100 which briefly illustrates one aspect of the inventive concepts. At block 102, the method can determine a first frequency at which an individual answer category appears in an individual slot on a query results page when utilizing a first or existing model. In one example, the determining can be performed on a set of query logs. From the query logs, the method can determine a percentage that the answer category appears in the individual slot utilizing the existing model.

At block 104 the method can ascertain a second frequency at which the individual answer category appears in the individual slot on the query results page when utilizing a second or new answer model. In one case, the ascertaining can be performed on the above mentioned query logs.

At block 106, the method can calibrate the new answer model so that second frequency approaches the first frequency. Examples of answer model calibration are discussed in more detail below relative to FIGS. 2-5.

First Search Results Scenario

Figure 1:
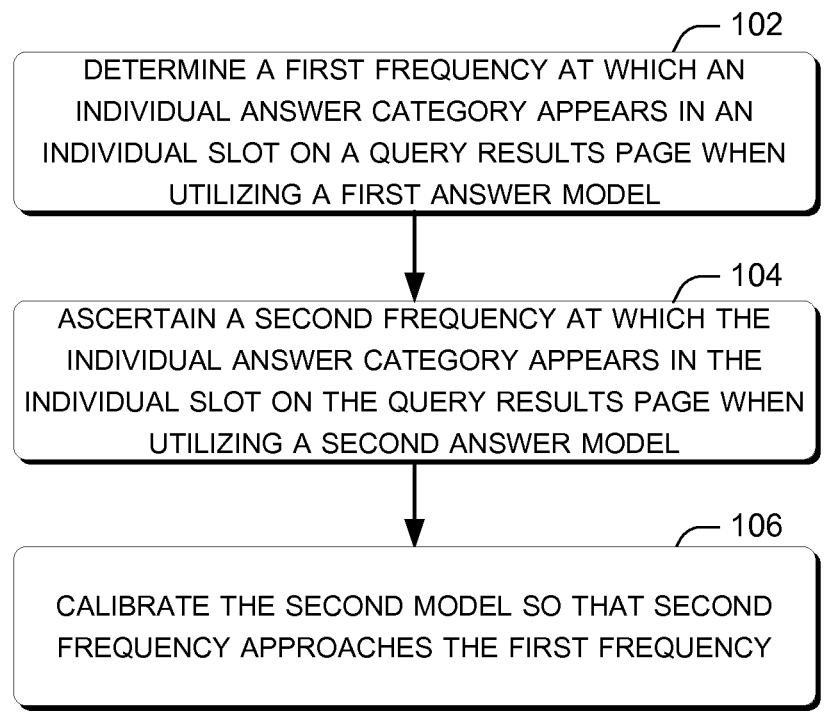
FIGS. 1 and 4 illustrate examples of methods for accomplishing answer model comparison concepts in accordance with some of the present concepts.
Figure 2:
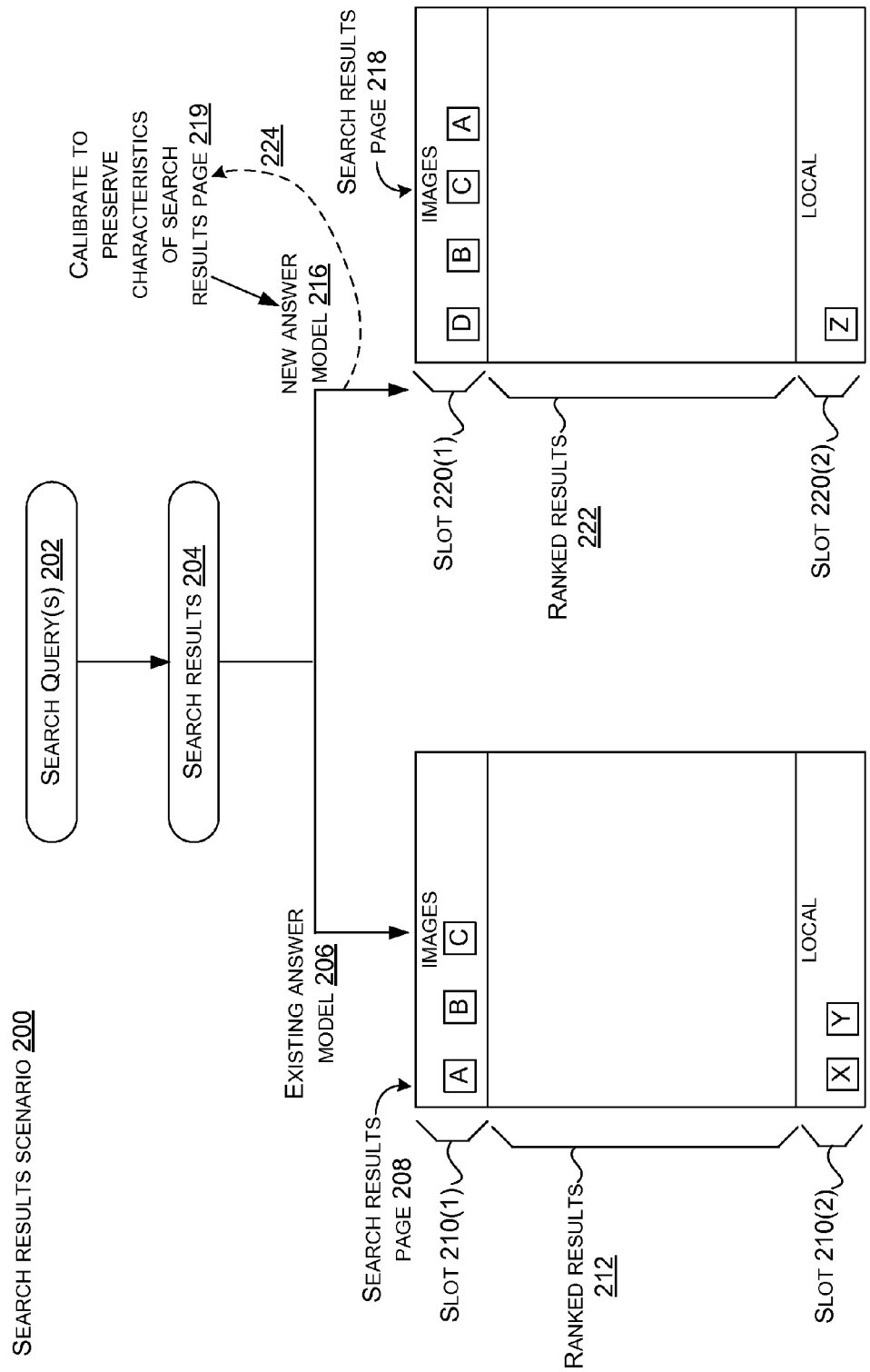
FIGS. 2 and 3 illustrate scenarios in which answer model comparison concepts can be implemented in accordance with some of the present concepts.

FIG. 2 shows a search results scenario 200 that offers an instance where some of the inventive concepts can be applied. In this case search queries are received at 202. Search results 204 are produced for the search queries 202, such as by a search engine. The search results 204 can be used by a existing answer model (or first answer model) 206. The existing answer model 206 can generate a search results page 208. The search results page can include zero, one, or more slots. In this case, two slots 210(1) and 210(2) are illustrated. In the illustrated configuration, the slots are positioned at the top and bottom of the search results page 208, but such need not be the case. Ranked search results can be displayed at 212. In this example, the ranked search results 212 are interposed between slots 210(1) and 210(2) but such need not be the case. (The number of slots and/or their relative position on the search results page is not critical.)

Individual slots 210(1) or 210(2) can be populated with answers of an individual answer category as determined by the existing answer model 206. In this example, the answer category 'images' is selected for slot 210(1) and the answer category 'local' is selected for slot 210(2). For purposes of explanation three image answers 'A', 'B', and 'C' are shown within slot 210(1). Similarly, two local answers 'X' and 'Y' are shown in slot 210(2). (The number of illustrated image answers and/or local answers is not critical and more or less answers could be included in a given answer category.)

Further, search results 204 can be received by new or second answer model 216 that can generate another search results page 218. Assume for purposes of discussion that the new answer model 216 may select more relevant content for search results page 218 than the existing answer model 206 selects for search results page 208. However, the new answer model 216 can be calibrated at 219 to preserve or maintain certain characteristics of search results page 208 generated by existing answer model 206. Such a situation could arise when an entity controlling the search results page wants to maintain specific characteristics of the search results page. For instance, the entity may have determined through some other means that one or more characteristics of the existing search results page are correct or desired. In the present example the characteristics that can be desired to be maintained from search results page 208 can relate to the number of slots, position of slots, and/or a percent that an individual answer category populates an individual slot. In this case, the search results page 218 includes two slots 220(1) and 220(2). Slots 220(1) and 220(2) are positioned at similar locations to slots 210(1) and 210(2), respectively. Further, slot 220(1) relates to the same answer category (i.e., images) as slot 210(1). Similarly, slot 220(2) relates to the same answer category (i.e., local) as slot 210(2).

Stated another way, the characteristic of the number of slots 210(1) and 210(2) on the search results page 208 and the characteristic of the answer categories of the individual slots is maintained (or otherwise approximated) by the calibration 219 of the new answer model 216. However, the individual answers selected for placement within an individual answer category may be different when comparing the existing answer model 206 and the new answer model 216. For example, slot 210(1) contains images 'A', 'B', and 'C' in descending order of ranking. However, slot 220(1) includes image answers 'D', 'B', 'C' and 'A' in descending rank. Similarly, slot 210(2) includes local answers 'X' and 'Y' while slot 220(2) includes local answer 'Z'. Thus, some characteristics of the existing answer model 206 can be maintained while the new answer model 216 can provide potentially more relevant content than the existing answer model (such as can be judged by user click-through rates).

In some implementations, the calibration 219 can be achieved in a single iteration. In other implementations, the calibration 219 can be repeated over multiple iterations until the results generated by new answer model 216 are within a predetermined threshold of the results generated by the existing answer model 206. This aspect will be discussed in more detail below relative to FIG. 4.

Second Search Results Scenario

Figure 3:
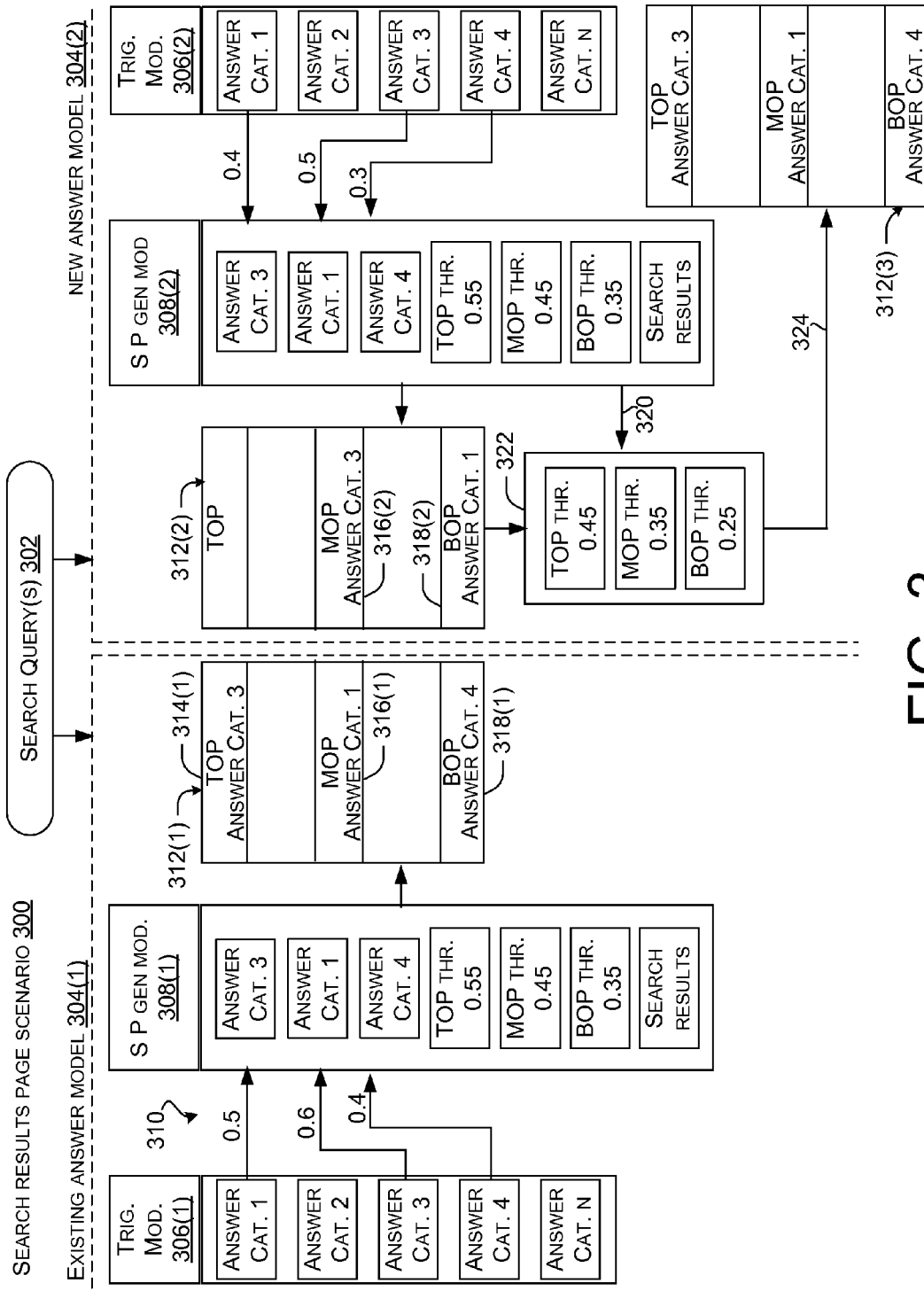

FIG. 3 shows a search results page scenario 300 that offers another instance where some of the inventive concepts can be applied. In this case, one or more search query(s) 302 can be supplied to an existing answer model 304(1) and a new answer model 304(2). In one example, the one or more search queries are obtained from a query log (not shown) that can be used to calibrate the new answer model 304(2). In such an example, thousands or millions of queries from the query log may be utilized to accomplish the calibration.

The existing answer model 304(1) can include a triggering module (trig mod) 306(1) and a search page generation module (S P gen mod) 308(1). Similarly, the new answer model 304(2) can include a triggering module (trig mod) 306(2) and a search page generation module (S P gen mod) 308(2). (In this discussion, the suffix (e.g., (1) or (2)) is utilized when addressing specific components. The suffixes are not utilized when addressing the components generically).

The triggering modules 306 are configured to receive search queries and to select zero, one, or more answer categories that are potentially relevant to the search query. For instance, in the present example, the available answer categories are represented as answer categories "1", "2", "3", "4" and "N" (where "N" indicates a highest number instantiation). In this example, as indicated generally at 310, triggering module 306(1) selects answer category 1 and assigns a relevancy score of 0.5. The triggering module 306(1) also selects answer category 3 and assigns a relevancy score of 0.6. Finally, the triggering module 306(1) selects answer category 4 and assigns a relevancy score of 0.4.

Search page generation module 308(1) receives the selected answer categories (1, 3, and 4) from the triggering module 306(1). The search page generation module 308(1) obtains a threshold for slots to be presented on a search results page 312(1). In the illustrated example, search page generation module 308(1) has a threshold value of 0.55 for a top of page (TOP or ToP) slot, a threshold value of 0.45 for a middle of page (MOP or MoP) slot, and a threshold value of 0.35 for a bottom of page (BOP or BoP) slot. The search page generation module 308(1) compares the relevancy scores of the selected answer categories to determine which, if any, answer categories are to be displayed on the search results page, and if so in what position (e.g., at which slot).

In this example, the relevancy score of answer category 3 is 0.6 which satisfies the top of page threshold of 0.55. Thus, search page generation module 308(1) positions answer category 3 in the TOP slot as indicated at 314(1). Similarly, answer category 1 has a relevancy score of 0.5 which satisfies the MOP slot threshold value of 0.45. Therefore, the search page generation module positions answer category 1 on the MOP slot as indicated at 316(1). Similarly, answer category 4 satisfies the BOP threshold and is positioned in the bottom slot as indicated at 318(1). Note, that while not specifically illustrated for sake of brevity, the search page generation module 308(1) also populates specific answers from the corresponding category into the appropriate slot. The search page generation module 308(1) further populates high ranking search results onto portions of the search results page not occupied by the slots. These aspects are described above relative to FIG. 2.

The new answer model 304(2) functions in a similar manner to that described above for the existing answer model 304(1). In this case, the new answer model's triggering module 306(2) selects the same three answer categories for the search query as triggering module 306(1). However, in this case, the relevancy scores are different (i.e., answer category 3 is given a relevancy score of 0.5, answer category 1 is given a relevancy score of 0.4 and answer category 4 is given a relevancy score of 0.3. Further, in this example, the search page generation module 308(2) has the same TOP threshold, MOP threshold, and BOP threshold as search page generation module 308(1) (i.e., 0.55, 0.45, and 0.35, respectively).

Recall, that the search page generation module 308(2) compares the relevancy scores against the TOP, MOP, and BOP threshold scores to determine if an answer category should be placed in an individual slot. In this case, none of the selected answer categories have a relevancy score that is high enough to satisfy the TOP threshold of 0.55. Thus, in search results page 312(1) the TOP slot does not include any answers (and instead this area could be populated with search results). Further, answer category 3 is populated in MOP 316(2) since it has a relevancy score of 0.5 which satisfies MOP threshold 0.45. Similarly, answer category 1 is populated into BOP slot 318(2) since is relevancy score of 0.4 satisfies the BOP threshold of 0.35.

In this instance, search results page 312(2) is not maintaining the characteristic slot population established by search results page 312(1). Accordingly, as indicated at 320, calibration is performed on the TOP threshold, MOP threshold and BOP threshold of the new answer model. Specifically, the TOP threshold is adjusted from 0.55 to 0.45, the MOP threshold is adjusted from 0.45 to 0.35, and finally, the BOP threshold is adjusted from 0.35 to 0.25. Note, that the adjusted threshold values designated at 322 diverge from the respective threshold values utilized by the search page generation module 308(1) of the existing ranking model 304(1). However, as indicated at 324, when the search page generation module generates a new search results page 312(3) utilizing the adjusted threshold values, the characteristic of the slot placement of search results page 312(1) is maintained in that in each case, answer category 3 is placed in the TOP slot, answer category 1 is placed in the MOP slot and answer category 4 is placed on the bottom page slot. In this case, answer category 3 has a relevancy score of 0.5 which satisfies the TOP adjusted threshold of 0.45, answer category 1 has a relevancy score of 0.4 which satisfies the adjusted MOP threshold of 0.35, and answer category 4 has a relevancy score of 0.3 which satisfies the adjusted BOP threshold of 0.25.

More detailed answer model adjustment implementations are described below relative to FIG. 4. Of course, while the characteristic answer category placement from the existing answer model 304(1) is maintained by adjusting the slot threshold values of the new triggering module, the new triggering module may provide more relevant answers within an individual answer category than those selected by the existing answer model. Answer relevancy can be judged in various ways. For instance, user click through rates of answers provided by the new and existing answer models can be compared.

To summarize, the task of matching answer coverages of two models that are used in a complex online ranking system can be difficult for several reasons. For one thing, the coverages of the same model can vary across different days of the week and across different months of the year based on the temporal nature of user search query patterns. For instance, the coverage of the video answer category that are shown at TOP can increase heavily in the weekend because of the spike in video queries. This makes the answer category coverages a moving target based on day of the week, among other factors. This phenomena creates a moving target for matching answer models. Further, each of these answer models may be experimentally run on different randomly picked buckets of search users with possibly different query search patterns. Thirdly, since multiple answer categories compete for the same slot on the page, not all answer categories get to be placed where the model suggests the answer category should be placed. Finally, there can be multiple placement constraints (e.g., external constraints) that are enforced on the search results page that prevent answers from being placed at certain slots on the page. These constraints are not necessarily factored in the answer models that are built.

The existing answer models tend to essentially assign a score to each answer category and use score thresholds for each slot on the search results page. The higher bucket the score assigned to an answer category falls into, the higher it gets to be placed on the page. Hence, the TOP threshold is set at a value that is higher than the MOP threshold which in turn is higher than the BOP Threshold. However, the range of scores is not fixed across answer models and hence each model has its own thresholds for TOP, MOP and BOP. Accordingly, from one perspective, the problem of coverage matching can be thought of as the problem of finding thresholds for a new answer model that match the answer category placements of the base or existing answer model. The model calibration techniques described herein address these issues by matching answer category coverage between answer models.

METHOD EXAMPLE

Figure 4:
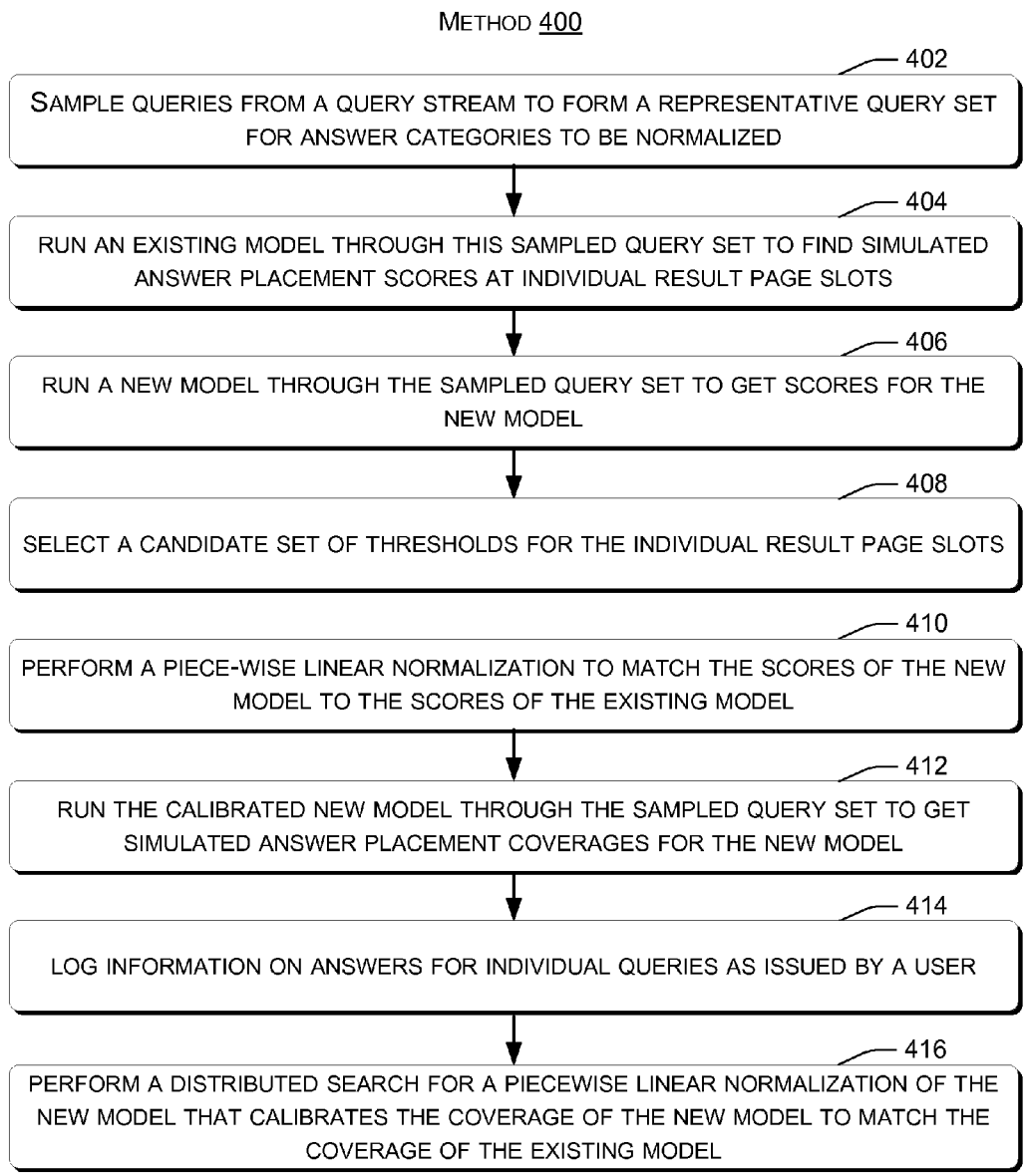

FIG. 4 illustrates a flowchart of a technique or method 400 that can calibrate machine learned answer models to match answer coverage of an existing answer model. For purposes of explanation, the method is explained relative to the TOP, MOP, and BOP slots introduced relative to FIG. 3. Of course the method can also be applied to other search result page configurations that employ fewer or more slots and/or different slot positions.

At block 402, the method can sample queries from a query stream to form a representative query set for answer categories to be normalized. In some cases, all queries of the query stream can be sampled to form the query set. In other implementations, fewer than all of the queries can be randomly sampled from the query stream to form the query set.

At block 404, the method can run a base or existing model through the sampled query set to find simulated answer category placement scores at individual slots, such as TOP, MOP and BOP.

At block 406 the method can run a new model through the sampled query set to get scores for the new model.

At block 408 the method can select a candidate set of thresholds for individual result page slots, such as TOP, MOP and BOP.

At block 410, the method can perform a piece-wise linear normalization to match the scores of the new model to the scores of the existing model.

At block 412, the method can run the calibrated new model through the sampled query set to get simulated answer placement coverages for the new model.

At block 414, the method can log information on answers for individual queries issued by a user. The logged information can include some or all of the features used by the existing model, as well as the initial ordering of the answer categories. The logged answers can be stored or logged for each query. This can allow the placement of each answer category for every search query to be recalculated using the existing model or new model.

At block 416, the method can perform a distributed search for a piecewise linear normalization of the new model that calibrates the coverage of the new model to match the coverage of the existing model. An example implementation is described below.

```
for each position in (TOP, MOP)
begin
    repeat N times
    begin
        concurrently for each logged impression
        begin
            for K thresholds between lower and upper bounds
            begin
                simulate ranking using threshold
            end
        end
        aggregate placement count for each threshold
        determine new lower and upper bounds for thresholds
    end
    final threshold is average of lower and upper bounds
end
```

The above described method details some exemplary technique for calibrating answer models. The order in which the above mentioned method(s) is described is not intended to be construed as a limitation, and any number of the described blocks can be combined in any order to implement the method(s), or an alternate method. Furthermore, the method(s) can be implemented in any suitable hardware, software, firmware, or combination thereof such that a computing device can implement the method(s). In one case, the method(s) is stored on a computer-readable storage media as a set of instructions such that execution by a processor of the computing device causes the computing device to perform the method(s).

Model Calibration System Example

Figure 5:
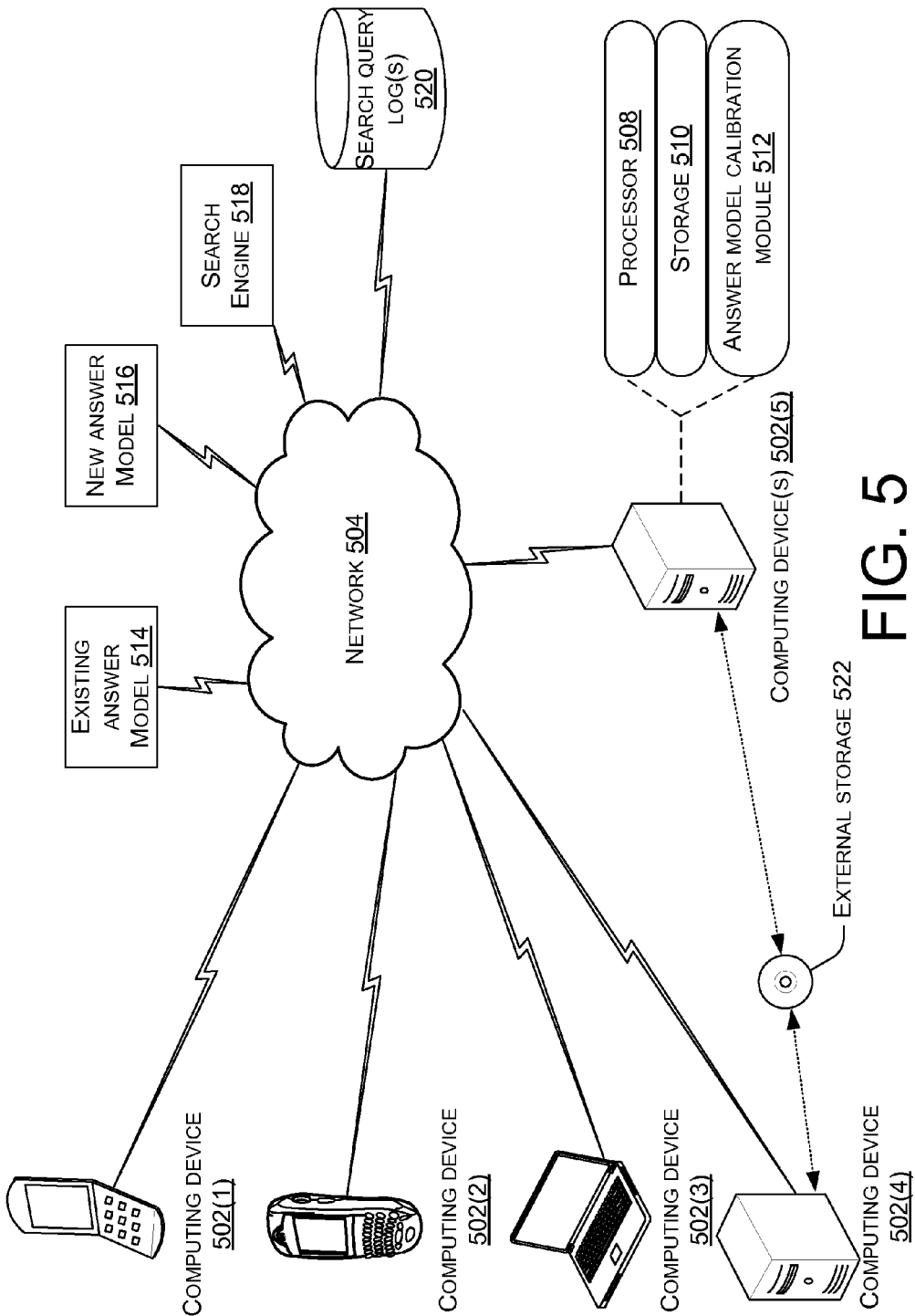
FIG. 5 is an example of an answer model comparison system in accordance with some implementations of the present concepts.

FIG. 5 shows an answer model calibration system 500 that is configured to accomplish concepts described above and below. In this case, answer model calibration system 500 includes first, second, third, fourth, and fifth computing devices 502(1), 502(2), 502(3), 502(4), and 502(5), respectively. The computing devices can exchange data, such as relating to a search query, over a network 504, such as the internet and/or other network. In one scenario, computing device 502(5) can be representative of resources available in a cloud computing environment, but such need not be the case.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices. Further, a system can be manifest on a single computing device or distributed over multiple computing devices.

Further details are described below relative to computing device 502(5) but can be equally applicable to any or all of computing devices 502(1)-502(4). Computing device 502(5) can include one or more processors 508, storage or storage media 510, and an answer model calibration module 512. Further, computing device 502(5) can include and/or access an existing answer model 514, a new answer model 516, a search engine 518, and/or search query logs 520.

Processor(s) 508 can execute data in the form of computer-readable instructions to provide a functionality. Data, such as computer-readable instructions can be stored on storage or storage media 510. The storage media 510 can include any one or more of volatile or non-volatile memory, hard drives, and/or optical storage devices (e.g., CDs, DVDs etc.), among others. The computing devices 502(1)-502(5) can also be configured to receive and/or generate data in the form of computer-readable instructions on external storage media or external storage 522. Examples of external storage media can include optical storage devices (e.g., CDs, DVDs etc.), hard drives, and flash storage devices (e.g., memory sticks or memory cards), among others. The computing devices may also receive data in the form of computer-readable instructions over network 504 that is then stored on the computing device for execution by its processor. In one case, instructions for performing a functionality of the answer model calibration module 512 can be stored on external storage media 522.

Answer model calibration module 512 can be configured to perform the calibration function introduced above relative to FIGS. 1-4. For instance, search queries can be generated by users on computing devices 502(1)-502(4) (and/or from other sources). Existing answer model 514 can generate a search results page for an individual search query that can be presented to the user. The search query log(s) 520 can map individual search queries, the resultant search result page, and any subsequent user interaction with the search result page, such as click through on specific items on the search result page. The search query log can be utilized for training the new answer model 516. However, even after such training, various characteristics of a search result page generated by the new answer model may differ from the same characteristics of a search result page generated by the existing answer model on the same query. The answer model calibration module 512 can apply various techniques, such as heuristics to calibrate the characteristics of search result pages generated by the new answer model to corresponding search result pages generated by the existing model.

Specific Model Calibration Example

Example Model Calibration:
Given:
Base model to match coverages with: $M_B$,
Thresholds used by the base model: $T_B = \{t_B^{ToP}, t_B^{MoP}, t_B^{BoP}\}$
Max and Min scores of the base model: $S_B^{MAX}, S_B^{MIN}$
Un-calibrated machine learned model: $M_{ML}$
Max and Min scores of the un-calibrated machine learned model: $S_{ML}^{MAX}, S_{ML}^{MIN}$
Issue of interest:
Score transformation function F(s) and thresholds $T_{ML} = \{t_{ML}^{ToP}, t_{ML}^{MoP}, t_{ML}^{BoP}\}$ to be used for the ML model $M_{ML}$ that matches the answer coverage of $M_{ML}$ with the base model $M_B$.
Calibrated machine learned model using thresholds $T_{ML}$: $M_{ML}^{Cal}$ 1. Sample a representative query set Q={q}
2. Find the target placement coverages (i.e., the percentage of queries in Q) that the base model MB places at specified slot positions, such as TOP, MOP and/or BOP:
$C_B = \{C_B^{ToP}, C_B^{MoP}, C_B^{Bop}\} = \text{Rank}(Q, M_B)$
3. Start with an initial set of thresholds $T_{ML}$ that match the score percentiles of $C_B$ in the range $(S_{ML}^{MAX}, S_{ML}^{MIN})$.
4. Create a function F(s) that maps points $T_B$ to $T_{ML}$ and interpolates points s' in-between the thresholds via linear approximation. This could be achieved via a piece-wise linear approximation or other non-linear function mappings. This aspect provides a candidate calibrated model $M_{ML}^{Cal}$
5. Find placement coverages of the candidate calibrated model $M_{ML}^{Cal}$ on Q using a ranking mechanism (the ranking may be performed offline or live):
$C_{ML} = \{C_{ML}^{ToP}, C_{ML}^{MoP}, C_{ML}^{BoP}\} = \text{Rank}(Q, M_{ML}^{Cal})$
6. If the distance (e.g. delta value) $D(C_{ML}, C_B)$ is less than a predetermined value, then the threshold is $T_{ML}$ and the calibrated ML model is $M_{ML}^{Cal}$. Quit.
7. If $C_{ML}$ doesn't match $C_B$, update the thresholds $T_{ML}$ in the range $(S_{ML}^{MAX}, S_{ML}^{MIN})$ appropriately to cover for a difference in coverages and iterate onto Step 4.

The above described technique can be employed by the answer model calibration module 512 to calibrate new answer model 516. This technique or similar techniques can also be utilized independently of the answer model calibration module. Alternatively or additionally, the answer model calibration module can utilize other techniques to achieve answer model calibration.

CONCLUSION

Although techniques, methods, devices, systems, etc., are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method implemented by at least one computing device, the method comprising:
   determining a first frequency at which an individual answer category appears in an individual first slot on a first query results page that is generated utilizing a first model;
   ascertaining a second frequency at which the individual answer category appears in an individual second slot on a second query results page that is generated utilizing a second model, the individual second slot on the second query results page corresponding to the individual first slot on the first query results page; and,
   calibrating the second model so that the second frequency at which the individual answer category appears in the individual second slot on the second query results page approaches the first frequency at which the individual answer category appears in the individual first slot on the first query results page.

2. The method of claim 1, wherein:
   the first query results page includes multiple first slots and the determining is performed for each of the multiple first slots; and
   the second query results page includes multiple second slots that each have a corresponding first slot on the first query results page, and the ascertaining and the calibrating are performed for each of the multiple second slots.

3. The method of claim 1, wherein the second model includes a second threshold value and wherein the individual answer category appears in the individual second slot on the second query results page in an instance when a ranking of the individual answer category by the second model satisfies the second threshold value.

4. The method of claim 3, wherein the first model includes a first threshold value and wherein the calibrating comprises determining a difference between the first threshold value of the first model and the second threshold value of the second model, and in an instance where the difference exceeds a predetermined distance, adjusting the second threshold value of the second model.

5. The method of claim 1, further comprising completing the calibrating in an instance where the second frequency approaches the first frequency within plus or minus a predetermined distance.

6. The method of claim 5, further comprising iteratively repeating the calibrating until a difference between the second frequency and the first frequency is less than the predetermined distance.

7. The method of claim 1, wherein the individual first slot and the individual second slot are top slots on the first query results page and the second query results page, respectively.

8. A system, comprising:
   at least one processor; and,
   an answer model calibration module that is executable by the at least one processor and that is configured to maintain one or more characteristics of a first search results page that is produced utilizing a first model in a second search results page that is produced utilizing a second model,
   wherein, to maintain the one or more characteristics of the first search results page in the second search results page, the answer model calibration module is configured to calibrate one or more second thresholds applied by the second model to produce the second search results page.

9. The system of claim 8 accomplished on a single computing device or in a cloud computing scenario.

10. The system of claim 8, wherein the one or more characteristics relate to answer category placement and wherein the answer model calibration module is configured to obtain percentages at which the first model positions individual answer categories at individual positions on the first search results page according to one or more first thresholds.

11. The system of claim 10, wherein the answer model calibration module is configured to obtain one or more initial second thresholds for the second model that match the percentages, and wherein the answer model calibration module is further configured to calibrate from the one or more initial second thresholds to one or more calibrated second thresholds utilizing a function of the one or more first thresholds and the one or more initial second thresholds.

12. The system of claim 8, wherein the answer model calibration module is configured to retain one or more other characteristics of the second search results page generated by the second model after the one or more second thresholds are calibrated.

13. The system of claim 12, wherein the one or more characteristics relate to answer category placement and the one or more other characteristics relate to answers selected to populate an individual answer category.

14. At least one hardware computer-readable storage media having instructions stored thereon that when executed by a computing device cause the computing device to perform acts, the acts comprising:
   sampling queries from a query stream to form a representative query set for answer categories to be normalized;
   running an existing model that is used to generate a first query results page through the representative query set to find first placement scores of individual answer categories at individual first slots of the first query results page, the individual first slots having associated first thresholds in the existing model; and,
   calibrating a new model that is used to generate a second query results page using the first placement scores.

15. The hardware computer-readable storage media of claim 14, wherein the calibrating comprises:
   running the new model through the representative query set to find second placement scores for the new model; and,
   selecting, based on the second placement scores, individual second thresholds for the new model, the individual second thresholds being associated with individual second slots of the second query result page that correspond to the individual first slots of the first query results page.

16. The hardware computer-readable storage media of claim 15, wherein the calibrating further comprises:
   performing a piece-wise linear normalization to match the second placement scores for the new model to the first placement scores of the existing model to calibrate the individual second thresholds of the new model; and,
   running the calibrated new model through the representative query set to get answer placement coverage for the new model.

17. The hardware computer-readable storage media of claim 16, wherein the calibrating further comprises:
   logging information on answers for individual queries as issued by a user.

18. The hardware computer-readable storage media of claim 17, wherein the calibrating further comprises:
   performing a distributed search for the piece-wise linear normalization that calibrates the answer placement coverage of the new model to match corresponding answer placement coverage of the existing model.

19. The hardware computer-readable storage media of claim 15, wherein the calibrating compensates for placement constraints that are imposed on the existing model.

20. The hardware computer-readable storage media of claim 14, wherein:
- the existing model populates a top slot of the first query results page with one or more first answers from a first answer category,
- the new model populates a corresponding top slot of the second query results page with one or more second answers, at least one second answer not being included in the one or more first answers, and
- the new model is calibrated to obtain the one or more second answers from the first answer category to populate the corresponding top slot of the second query results page.

* * * * *